United States Patent [19]
Pechhold

[11] 4,120,850
[45] Oct. 17, 1978

[54] POLYETHER URETHANE POLYMERS PREPARED FROM A COPOLYMER OF TETRAHYDROFURAN AND ETHYLENE OXIDE

[75] Inventor: Engelbert Pechhold, Chadds Ford, Pa.

[73] Assignee: E. I. Du Pont de Nemours and Company, Wilmington, Del.

[21] Appl. No.: 830,472

[22] Filed: Sep. 6, 1977

[51] Int. Cl.$^2$ ............................................. C08G 18/48
[52] U.S. Cl. ........................................ 528/66; 528/46; 528/65; 528/404
[58] Field of Search ............... 260/77.5 AM, 77.5 AP

[56] References Cited

U.S. PATENT DOCUMENTS

| | | | |
|---|---|---|---|
| 2,929,800 | 3/1960 | Hill | 260/77.5 AP |
| 3,216,975 | 11/1965 | Kunde et al. | 260/77.5 AM |
| 3,404,131 | 10/1968 | Taub | 260/77.5 AM |
| 3,425,999 | 2/1969 | Axelrood | 260/77.5 AP |
| 3,461,104 | 4/1969 | Stewart | 260/77.5 AP |

FOREIGN PATENT DOCUMENTS

| | | | |
|---|---|---|---|
| 897,880 | 4/1972 | Canada | 260/77.5 AM |
| 1,028,722 | 5/1966 | United Kingdom | 260/2.5 AP |

OTHER PUBLICATIONS

Industrial & Engineering Chemistry, 52, No. 9, pp. 772–775, 1960.
Dickinson, J. Polymer Sci., 58, pp. 857–865, 1962.

*Primary Examiner*—M. J. Welsh

[57] ABSTRACT

A polyether urethane polymer which is the reaction product of
(a) a difunctional copolymer of tetrahydrofuran and ethylene oxide or propylene oxide;
(b) an organic diisocyanate; and
(c) an aliphatic diol of 2 to 10 carbon atoms;
useful as an elastomer.

9 Claims, No Drawings

POLYETHER URETHANE POLYMERS PREPARED FROM A COPOLYMER OF TETRAHYDROFURAN AND ETHYLENE OXIDE

BACKGROUND OF THE INVENTION

This invention relates to polyether urethane polymers and to a process for their preparation.

Urethane urea polymers prepared using copolyether glycols [copolymers of tetrahydrofuran (THF) and ethylene oxide (EO)] as one of the starting materials are well known. Preparation of such a polymer is shown in U.S. Pat. No. 3,425,999 to Axelrood and Lajiness, and involves the reaction of a THF/EO copolymer with an organic polyisocyanate to form a prepolymer, and the subsequent reaction of the prepolymer with an amine chain-extending agent to form a urethane urea polymer. While urethane urea polymers of this type are generally satisfactory for use as elastomers, they have, for certain applications, been found deficient in their resistance to degradation on exposure to moisture. Moreover, the amine chain-extending agents preferred for use by Axelrood and Lajiness, dichlorobenzidine and methylene bis(2-chloroaniline), have been designated carcinogens by the U.S. Occupational Safety and Health Administration, and their use is now looked upon with disfavor.

SUMMARY OF THE INVENTION

It has now been found that polyurethane products with better resistance to degradation on exposure to moisture than those of Axelrood and Lajiness can be made by using as reactants, (a) a copolymer of THF and EO or propylene oxide (PO), the copolymer containing about 20% to about 70% by weight of EO or PO units and having a number average molecular weight of about 550 to about 3,000 and a hydroxyl functionality of 2.0;

(b) an organic diisocyanate; and (c) a linear aliphatic diol of 2 to 10 carbon atoms. The use of diols as chain-extending agents in preparing the polyurethanes of the invention not only provides polyurethanes with better resistance to degradation on exposure to moisture than those of Axelrood and Lajiness, but also eliminates the use of the carcinogenic amines.

DETAILED DESCRIPTION OF THE INVENTION

The copolyether glycols used in preparing the polyether urethane polymers of the invention are copolymers of THF and EO or PO, containing about 20% to about 70% by weight of EO or PO units, preferably about 35% to about 50%. The copolymers have number average molecular weights of about 550 to about 3,000, preferably about 650 to 1,000, and have a hydroxyl functionality of 2.0.

Number average molecular weight of the copolymer is determined by first determining the hydroxyl number of the copolymer by titration with acetic anhydride according to ASTM-D-1638 and then converting this number to number average molecular weight according to the formula $$\text{Molecular weight} = \frac{112,200}{\text{hydroxyl number}}$$

The copolyether glycol can be prepared by the method shown in British Pat. No. 854,958, whereby THF and EO or PO are copolymerized using an acid-activated bleaching earth (montmorillonite clay) as a catalyst and water or a glycol as a molecular weight regulator. The specification of British Pat. No. 854,958 is incorporated into this application by reference to show how such glycols are prepared.

The organic diisocyanates used in preparing the polyether urethane polymers of the invention can be any of the aliphatic or aromatic diisocyanates ordinarily used in preparing polyurethanes. Illustrative are 2,4-toluene diisocyanate, 2,6-toluene diisocyanate, hexamethylene-1,6-diisocyanate, tetramethylene-1,4-diisocyanate, cyclohexane-1,4-diisocyanate, naphthalene-1,5-diisocyanate, diphenylmethane-4,4'-diisocyanate, dicyclohexylmethane-4,4'-diisocyanate and 4,4'-biphenylene diisocyanate. Mixtures of diisocyanates can also be used. Diphenylmethane-4,4'-diisocyanate is preferred for use because of the desirable properties its use confers on the polyurethane products.

The diols used as chain extenders in preparing the polyether urethane polymers of the invention are the linear aliphatic diols containing 2 to 10 carbon atoms. Illustrative are ethylene glycol, 1,4-butanediol and 1,6-hexanediol. Diols like hydroquinone bis(betahydroxyethyl) ether, even though they contain aromatic rings, are considered to be aliphatic diols for purposes of this invention. Mixtures of diols can also be used. 1,4-Butanediol is preferred because of the desirable properties its use confers on the polyurethane products.

The polyurethanes of the invention are prepared in two steps, each of which is conducted under nitrogen at ambient pressure to prevent oxidation of the reactants and product, and to prevent exposure of the reaction mass to atmospheric moisture. In the first step, the copolyether glycol starting material is degassed by heating it under vacuum, then heated to 60° to 100° C., preferably about 80° C., and held there while a stoichiometric excess, preferably twofold to fourfold, of organic diisocyanate is added, with stirring. The reaction mass is held for about 1 to 4 hours at 60° to 80° C., with stirring, and the free isocyanate content of the mass is then determined by titrating it with di-n-butylamine, as described in Analytical Chemistry of the Polyurethanes, Volume XVI, Part III, D. J. David and H. B. Staley, Wiley-Interscience, 1969, pages 357 to 359.

An amount of diol chain extender calculated to give an isocyanate/hydroxyl mole ratio of about 0.9–1.1 to 1 in the reaction mass is then preheated to about 60° to 80° C. and quickly added to the reaction mass.

A conventional curing catalyst can be added at this point if desired. Illustrative of catalysts which can be used are dibutyltin dilaurate and stannous octoate. The catalyst can be added to the reaction mass to give a concentration of about 0.001% to about 0.1%, by weight, preferably about 0.01%, by weight.

The reaction mass is held with stirring at 60° to 80° C. until it is homogeneous, which normally takes 1 to 5 minutes. The mass is then cast into preheated molds and cured at about 110° C. for 15 to 24 hours. The casting is cooled, removed from the mold and aged for about one week, and is then ready for use.

The polyether urethane polymers thus prepared are elastomers, useful for coating rollers, and for fabricating machine parts, solid automobile tires, industrial belts, shoe soles and heels, cable jackets, insulation and automobile bumpers.

EXAMPLES

In the following examples, all percentages and parts are by weight unless indicated otherwise.

EXAMPLE 1

Fifty parts of acid-activated Wyoming bentonite was slurried in 50 parts of THF, and to this slurry was added, at ambient temperature and with stirring, over a period of one hour, a mixture of 450 parts of THF, 94.7 parts of EO and 6 parts of water.

The resulting reaction mass was held at 55° C. for one hour, with stirring, and the clay was then filtered off. Volatiles were removed from the filtrate by heating it on a steam bath under a vacuum of 3 to 5 mm of mercury. The product was a colorless liquid copolyether glycol having an EO content of 36%, a number average molecular weight of 990 and a hydroxyl functionality of 2.0.

EXAMPLE 2

Into a polymerization kettle was charged 100 parts (1 mole) of the copolyether glycol of Example 1. The glycol was dried under a vacuum of 5 to 10 mm of mercury for ½ hour at 80° C. and to it was then added, at 80° C., with stirring, 64.8 parts (2.57 moles) of diphenylmethane-4,4'-diisocyanate.

The reaction mass was held, under nitrogen and with stirring, for 2 hours at 80° C. to give a prepolymer containing 7.91% of free isocyanate.

The prepolymer was degassed for ½ hour at 80° C. under a vacuum of 5 to 10 mm of mercury, and to 155 parts thereof was added 12.5 parts of 1,4-butanediol preheated to 70° C., to give an isocyanate/hydroxyl mole ratio in the reaction mass of 1.05 to 1. The reaction mass was held at 80° C., with stirring and under nitrogen unitl it was homogeneous, and was then cast into molds preheated to 110° C. and cured at 110° C. for 15 hours.

The resulting elastomeric polyether urethane polymer was then removed from the mold and aged for 7 days under ambient conditions.

The properties of the resulting elastomer are shown in Table 1.

EXAMPLE 3

A prepolymer was prepared as in Example 2.

One hundred fifty parts of this prepolymer, having a free isocyanate content of 7.86%, was degassed for ½ hour at 80° C. under a vacuum of 5 to 10 mm of mercury. To it was then added, with stirring, at 80° C., 15.8 parts of 1,6-hexanediol preheated to 70° C., to give an isocyanate/hydroxyl mole ratio in the reaction mass of 1.05 to 1. The reaction mass was then held at 80° C., with stirring and under nitrogen, until it was homogeneous.

The resulting elastomeric polyether urethane polymer was cast, cured and aged as shown in Example 2. Its properties are shown in Table 1.

EXAMPLE 4

A copolyether glycol having an EO content of 49.3%, a number average molecular weight of 954 and a hydroxyl functionality of 2.0 was prepared as shown in Example 1, using 450 parts of THF, 378 parts of EO and 11.7 parts of water instead of the amounts shown.

The resulting copolyether glycol was used to prepare a prepolymer, as shown in Example 2. To 150 parts of this prepolymer, having a free isocyanate content of 7.76%, was added 11.9 parts of 1,4-butanediol preheated to 70° C. to give an isocyanate/hydroxyl mole ratio in the reaction mass of 1.05 to 1. The reaction was conducted as shown in Example 2. The product was then cast, cured and aged, also as shown in Example 2.

The properties of the resulting elastomeric polyether urethane polymer are shown in Table 1.

EXAMPLE 5

A copolyether glycol having an EO content of 35.7%, a number average molecular weight of 610 and a hydroxyl functionality of 2.0 was parpared as shown in Example 1, using 450 parts of THF, 94.7 parts of EO and 11.3 parts of water instead of the amounts shown.

One hundred parts of the copolyether glycol (1 mole) was brought into contact with 86.2 parts (2.1 moles) of diphenylmethane-4,4'-diisocyanate as shown in Example 2, to produce a prepolymer.

To 175 parts of the prepolymer, having a free isocyanate concentration of 7.8%, was then added 13.9 parts of 1,4-butanediol preheatd to 70° C., to give an isocyanate/hydroxyl mole ratio in the reaction mass of 1.05 to 1. The reaction was conducted as shown in Example 2. The product was then cured, cast and aged, also as shown in Example 2.

The properties of the resulting elastomer polyether urethane polymer are shown in Table 1.

EXAMPLE 6

A THF/PO copolyether glycol having a PO content of 34%, a number average molecular weight of 1,034 and a hydroxyl functionality of 2.0 was made by the method shown in Example 1; using 450 parts of THF, 141 parts of PO and 6.6 parts of water instead of the amounts shown.

One hundred parts of the copolyether glycol (1 mole) was brought into contact with 64 parts of diphenylmethane-4,4'-diisocyanate (2.65 moles), as shown in Example 2, to produce a prepolymer.

To 175 parts of the prepolymer, having a free isocyanate concentration of 8.07%, was then added 12.8 parts of 1,4-butanediol preheated to 70° C., to give an isocyanate/hydroxyl mole ratio in the reaction mass of 1.05 to 1. The reaction was conducted as shown in Example 2. The product was then cured, cast and aged, also as shown in Example 2.

The properties of the resulting polyether urethane polymer are shown in Table 1.

TABLE I

| Test | Test Method ASTM | Elastomer Properties Example No. | | | | |
| --- | --- | --- | --- | --- | --- | --- |
| | | 2 | 3 | 4 | 5 | 6 |
| Hardness, Shore A | D 2240 | 89 | 90 | 85 | 85 | 87 |
| Modulus, 100%, kilograms/sq.cm | D 412 | 83 | 71 | 63 | 84 | 77 |
| Modulus, 300%, kilograms/sq.cm | D 412 | 158 | 119 | 115 | 213 | 131 |
| Tensile Strength, kilograms/sq.cm | D 412 | 384 | 268 | 279 | 330 | 250 |
| Elongation, % | D 412 | 485 | 600 | 600 | 430 | 525 |
| Tear, kilograms/cm | D 470 | 19.8 | 25.9 | 8.2 | 21.2 | 23.2 |

TABLE I-continued

| Test | Test Method ASTM | Example No. 2 | 3 | 4 | 5 | 6 |
|---|---|---|---|---|---|---|
| Resilience, Bashore Rebound, % | D 2632 | 40 | 40 | 41 | 17 | 36 |
| Compression Set, % | D 395-B | 54 | 52 | 54 | 64 | 40 |
| Clash-Berg, °C | D 1043 | | | | | |
| $T_4$-Modulus (E) 703 kilograms/sq.cm. | | −23 | −14 | −14 | −1 | −12 |
| $T_f$-Modulus (E) 9490 kilograms/sq.cm. | | −52 | −46 | −38 | −3 | −49 |

I claim:

1. A polyether urethane polymer which is the reaction product of
   (a) a copolymer of tetrahydrofuran and ethylene oxide or propylene oxide, the copolymer containing about 20% to about 70%, by weight, of ethylene oxide or propylene oxide units and having a number average molecular weight of about 550 to about 3,000 and a hydroxyl functionality of 2.0;
   (b) an organic diisocynate; and
   (c) 1,4-butanediol or hydroquinone bis(betahydroxyethyl)ether.

2. The polymer of claim 1, wherein the diisocyanate used is diphenylmethane-4,4'-diisocyanate.

3. The polymer of claim 1, wherein the diol used is 1,4-butanediol.

4. The polymer of claim 1, wherein the copolymer used has a number average molecular weight of about 650 to about 1,000.

5. A polyether urethane polymer which is the reaction product of
   (a) a copolymer of tetrahydrofuran and ethylene oxide, the copolymer containing about 35% to about 50%, by weight, of ethylene oxide units and having a number average molecular weight of about 650 to about 1,000 and a hydroxyl functionality of 2.0;
   (b) diphenylmethane-4,4'-diisocyanate; and
   (c) 1,4-butanediol.

6. A process for preparing a polyether urethane polymer, the process comprising
   (a) bringing together, under conditions suitable for reaction,
      (1) a copolymer of tetrahydrofuran and ethylene oxide or propylene oxide, the copolymer containing about 20% to about 70%, by weight, of ethylene oxide or propylene oxide units and having a number average molecular weight of about 550 to about 3,000 and a hydroxyl functionality of 2.0; and
      (2) a stoichiometric excess of an organic diisocyanate, to form a prepolymer; and then
   (b) bringing together, under conditions suitable for reaction, the prepolymer product of (a) and an amount of 1,4-butanediol or hydroquinone bis(betahydroxyethyl)ether calculated to give an isocyanate/hydroxyl mole ratio in the reaction mass of about 0.9–1.1 to 1.

7. The process of claim 6 wherein the diisocynate used is diphenylmethane-4,4'-diisocyanate.

8. The process of claim 6 wherein the diol used is 1,4-butanediol.

9. The process of claim 6 wherein the amount of diol is calculated to give an isocynate/hydroxyl mole ratio of 1.05 to 1.